United States Patent Office.

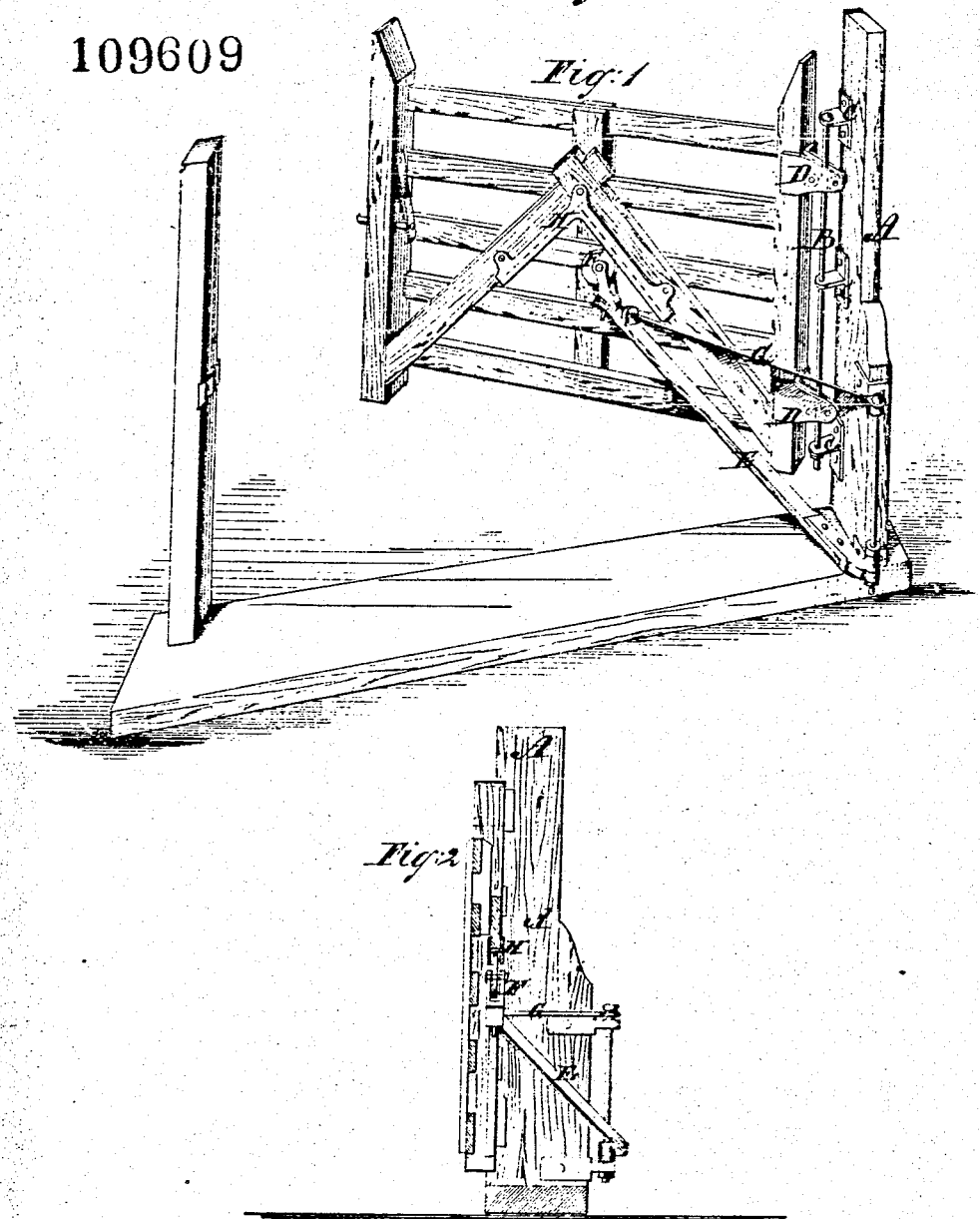

ELIJAH GEMBERLING, OF ELKHART, INDIANA.

Letters Patent No. 109,609, dated November 29, 1870.

IMPROVEMENT IN GATES.

The Schedule referred to in these Letters Patent and making part of the same.

*To all whom it may concern:*

Be it known that I, ELIJAH GEMBERLING, of Elkhart, in the county of Elkhart and State of Indiana, have invented a new and useful Improvement in Gates; and I do hereby declare that the following is a full, clear, and exact description thereof, which will enable others skilled in the art to make and use the same, reference being had to the accompanying drawing forming part of this specification.

This invention relates to improvements in gates, and consists in hinging the gate to the post, so that it can rise and fall readily in opening and closing, and in combining with it an arm hinged to the post, to swing with the gate, which arm carries at the swinging end a roller, on which an angle plate mounted on the gate at about the center works, so as to cause the gate to rise when swinging open either way for the purpose of causing it to close by gravitation; also for preventing it from sagging at the swinging end, all as hereinafter described.

Figure 1 is a perspective view of my improved gate, and

Figure 2 is a transverse section of the same.

Similar letters of reference indicate corresponding parts.

A is the post, on the side of which the gate is hung, preferably, near one edge, by means of a rod, B, supported in the brackets C, and the brackets D, so that it may slide up and down the said brackets D, being provided with small friction-pulleys bearing on the rod, to cause the gate to work easily.

E is the arm for supporting the pulley F, on which the weight of the gate is mainly suspended, and on which it rises and falls.

This arm is also hinged to the side of the post A, and, preferably, near the edge opposite to that on which the gate is hung, but it does not rise and fall, as the gate does.

G is a supporting brace for the arm E, also hinged to the post, and in the axis of the joint of the arm E.

H is the angle-plate mounted on the same side of the gate that the arm E is, and about at the center.

In this instance it is grooved on the under side, and rests on the wheel F, which works in the groove and takes the weight of the gate mainly.

As the arm E is not hung in the same vertical axis that the gate is, the paths of the wheel and the angle-plate in swinging are eccentric to each other, so that in opening one way, one part of the said plate will be forced up on the wheel, and, in opening the other way, the other will be forced up, in either case causing the gate to rise, whereby it will be closed from either side by gravity, the arm E, being so adjusted as to length that when the gate is shut, the wheel F will be at the angle between the two plates.

The tendency of the gate to fall will, by this arrangement, always cause it to close automatically and remain closed.

It will be seen that the gate, being thus supported at the center, it will not sag at the swinging end, as gates hung wholly at one end do.

It will also be seen that, by this arrangement, the gate may be so adjusted that, when closed, the two end posts may rest on the ground, and thus take the weight, while closed, wholly off both the hinge and the arm E.

The arrangement admits of raising the gate vertically when closed, to allow small animals to pass under, and yet prevent the passage of larger ones.

Having thus described my invention,

I claim as new and desire to secure by Letters Patent—

The combination with the gate, hinged so that it may rise and fall, as described, of the angle-plate or bar H, the hinged arm E, and the roller F, all substantially as specified.

ELIJAH GEMBERLING.

Witnesses:
ABRAM PAULUS,
F. C. ECKELMAN.